No. 695,897. Patented Mar. 18, 1902.
J. A. WALKER.
WINDMILL REGULATOR.
(Application filed Dec. 2, 1901.)
(No Model.)
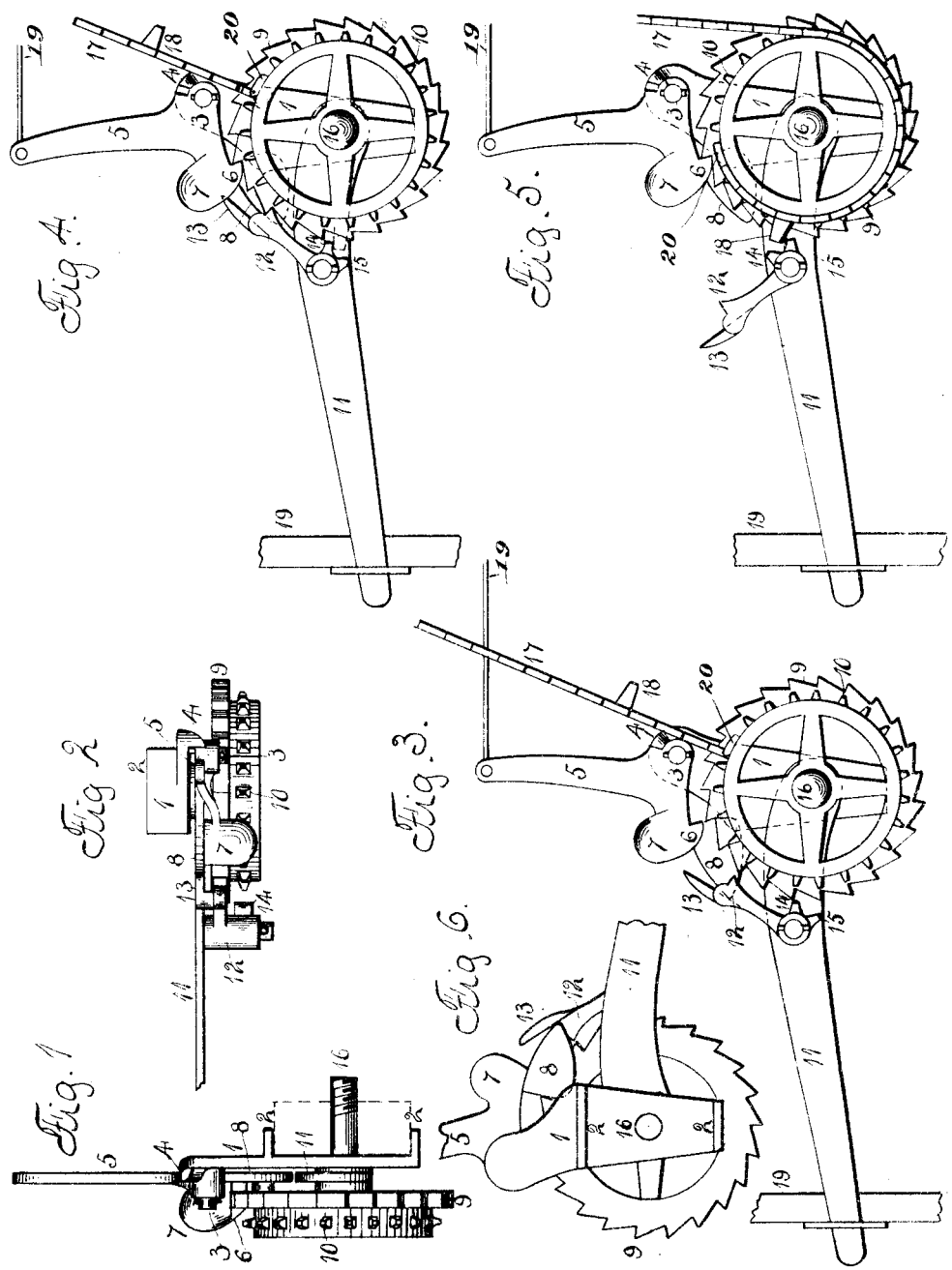
Witnesses:
E. Behel.
C. Clark
Inventor:
James A. Walker
By A. O. Behel
Atty.

UNITED STATES PATENT OFFICE.

JAMES A. WALKER, OF ROCKFORD, ILLINOIS, ASSIGNOR OF ONE-HALF TO CHARLES W. WEAVER, OF ROCKFORD, ILLINOIS.

WINDMILL-REGULATOR.

SPECIFICATION forming part of Letters Patent No. 695,897, dated March 18, 1902.

Application filed December 2, 1901. Serial No. 84,416. (No model.)

*To all whom it may concern:*

Be it known that I, JAMES A. WALKER, a citizen of the United States, residing at Rockford, in the county of Winnebago and State of Illinois, have invented certain new and useful Improvements in Windmill-Regulators, of which the following is a specification.

The object of this invention is to construct a regulator for windmills controlled by a float which automatically holds the mill out of the wind and permits it to move into the wind, according to the stage of water in the tank.

In the accompanying drawings, Figure 1 is an edge elevation of my improved regulator. Fig. 2 is a plan view. Figs. 3, 4, and 5 are front face elevations. Fig. 6 is a rear face view.

A bracket 1 has a central opening and two lugs 2. The upper end of this bracket has a stud 3 and a projection 4. A lever 5 is pivotally supported by the stud 3 and has an extension formed with a hook 6. A weight 7 forms a part of this lever, and a plate 8 extends beyond the weight. A cord 19 has a connection with the lever 5. A wheel is formed with ratchet-teeth 9 and sprocket-teeth 10. A lever 11 supports a dog 12. The dog has a side wing 13 and two projections 14 and 15. The lever 11 and combined ratchet and sprocket wheel are pivotally supported by a bolt 16, passing through the bracket and any suitable support. A linked chain 17 has a pivotal connection with the sprocket-section of the combined ratchet and sprocket wheel through the medium of the piece 20, and a projection 18 extends from one of the links. The free end of the lever 5 has a connection with a float located in a tank through the cord 19, so that the rising and falling movements of the float will rock the lever in its connection with the bracket 1 and move the hook 6 into and out of engagement with the teeth 9 of the ratchet portion of the combined ratchet and sprocket wheel. The arm 11 has a connection with the pumping-rod 19 of the windmill, and as rod reciprocates the arm will be oscillated and the dog 12, carried by the arm, will engage the teeth 9 of the ratchet portion of the combined ratchet and sprocket wheel.

With the parts in the position shown at Fig. 3 the water in the tank is low and the float connected to the lever 5 holds the hook 6 free of the teeth 9, and the wing 13 of the dog 12 will ride on the plate 8, and as the lever 11 oscillates the dog 12 will be held free of the teeth 9. The chain belt 17, connected to the sprocket portion of the combined ratchet and sprocket wheel, has a connection with the throwing in and out mechanism of the windmill, and in the position shown in Fig. 3 the wind-wheel is in the wind and water is being pumped into the tank containing the float. When sufficient water has been pumped to raise the float, the lever 5 will be moved, allowing the hook to drop into engagement with the teeth 9, and the plate 8 being a part of the lever will move with it, when it will occupy the position shown at Fig. 4. The dog 12 will drop into engagement with the teeth 9, and as the lever 11 reciprocates the combined ratchet and sprocket wheel will be intermittently rotated, the hook 6 preventing the backward movement of the wheel. As the wheel is rotated the chain will be wound around the wheel, which will pull the wind-wheel out of the wind, and when the projection 18, carried by one of the links of the chain, engages the projection 14 of the dog the dog will be thrown out of engagement with the teeth, as shown at Fig. 5, when the pumping-rod will cease moving. When the water in the tank has lowered sufficiently to move the hook 6 out of engagement with the teeth 9, the wheel is free to revolve, and the mechanism at the windmill will draw on the chain 17, thereby partially rotating the wheel and allowing the wind-wheel to move into the wind. As the wheel starts to rotate backward the projection 18, carried by one of the links of the chain, will come in contact with the projection 15, extending from the dog 12, and will throw the dog toward the wheel, and the wing 13 will rest upon the plate 8, when the parts will appear as shown at Fig. 3, and in this position the pumping-rod can move until sufficient water is pumped into the tank to raise the float, when the operations will be repeated. By this arrangement no attention need be paid to the apparatus or tank, as they are controlled entirely by the movement of the float. As the movement required to move the wind-wheel in and out of the wind varies, the link having the projection 18 can be inserted at any point of the chain belt, so as to give the required movement. The projection 4 acts as a stop to the movement of the lever 5 in one direction.

I have not shown the windmill or tank, with its float, as such parts are well understood.

I claim as my invention—

1. In a windmill-regulator, the combination of a suitable support, a ratchet-wheel, a pivoted bar, a dog pivotally supported by the bar, a lever having a hook engaging the ratchet-wheel and provided with a projection serving to hold the dog free of the ratchet-wheel, and a projection movable with the ratchet-wheel adapted to move the dog into and out of engagement with the ratchet-wheel.

2. In a windmill-regulator, the combination of a suitable support, a ratchet-wheel, a pivoted bar, a dog pivotally supported by the bar having two projections, a lever having a hook engaging the ratchet-wheel and provided with a projection serving to hold the dog free of the ratchet-wheel, a band connected to the ratchet-wheel carrying a projection adapted to engage the projection of the dog.

3. In a windmill-regulator, the combination of a suitable support, a ratchet-wheel, a pivoted bar, a dog pivotally supported by the bar and having two projections, a projection movable with the ratchet-wheel adapted to engage the projections of the dog and move the dog into and out of engagement with the ratchet-wheel, and a dog holding the ratchet-wheel against backward movement.

JAMES A. WALKER.

Witnesses:
A. O. BEHEL,
E. BEHEL.